(12) United States Patent
Homma et al.

(10) Patent No.: US 11,268,600 B2
(45) Date of Patent: Mar. 8, 2022

(54) LINEAR MOTION GUIDE DEVICE AND METHOD FOR MANUFACTURING LINEAR MOTION GUIDE DEVICE

(71) Applicant: THK CO., LTD., Tokyo (JP)

(72) Inventors: Kazuto Homma, Tokyo (JP); Kenichi Hasebe, Tokyo (JP); Kaoru Hoshide, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/955,982

(22) PCT Filed: Jan. 22, 2019

(86) PCT No.: PCT/JP2019/001930
§ 371 (c)(1),
(2) Date: Jun. 19, 2020

(87) PCT Pub. No.: WO2019/155874
PCT Pub. Date: Aug. 15, 2019

(65) Prior Publication Data
US 2020/0309238 A1 Oct. 1, 2020

(30) Foreign Application Priority Data
Feb. 9, 2018 (JP) .............................. JP2018-022043

(51) Int. Cl.
*F16H 25/20* (2006.01)
*F16C 29/06* (2006.01)

(52) U.S. Cl.
CPC ............. *F16H 25/20* (2013.01); *F16C 29/06* (2013.01); *F16H 2025/204* (2013.01)

(58) Field of Classification Search
CPC ............... F16H 25/20; F16H 2025/204; F16H 2025/2075; F16H 2025/2031;
(Continued)

(56) References Cited

U.S. PATENT DOCUMENTS

| 5,234,386 | A | * | 8/1993 | Nagai | ....................... | B23Q 1/56 |
|           |   |   |        |       |                         | 474/148 |
| 5,454,278 | A | * | 10/1995 | Kasuga | ..................... | B23Q 1/58 |
|           |   |   |        |       |                         | 184/5 |
| 6,240,796 | B1 |  | 6/2001 | Yamada |                    |        |

(Continued)

FOREIGN PATENT DOCUMENTS

| CN | 1269474 A | 10/2000 |
|----|-----------|---------|
| CN | 101191517 A | 6/2008 |

(Continued)

OTHER PUBLICATIONS

Office Action and Search Report dated Nov. 17, 2020, issued in counterpart CN Application No. 201980008410.1, with Partial translation (8 pages).

(Continued)

*Primary Examiner* — Bobby Rushing, Jr.
(74) *Attorney, Agent, or Firm* — Westerman, Hattori, Daniels & Adrian

(57) ABSTRACT

The method for manufacturing a linear motion guide device includes a step of forming a long member (8) having a pair of side wall parts (51) and a bottom wall part (52), a step of attaching a track body (4) to the pair of side wall parts (51) of the long member (8), and a step of cutting away a base member (5) to which the track body (4) is attached by cutting the long member (8) together with the track body (4) into a desired length.

5 Claims, 14 Drawing Sheets

(58) Field of Classification Search
CPC ..... F16H 2025/2034; F16H 2057/0227; F16H 57/023; F16H 2057/02086; F16H 2025/2037
See application file for complete search history.

(56) References Cited

U.S. PATENT DOCUMENTS

| | | | | |
|---|---|---|---|---|
| 6,293,183 | B1* | 9/2001 | Noda | F15B 15/082 92/88 |
| 9,333,469 | B2* | 5/2016 | Brinker | F16H 25/2025 |
| 9,464,704 | B2* | 10/2016 | Mori | F16H 57/0497 |
| 9,797,489 | B2* | 10/2017 | Baric | F16H 25/20 |
| 2010/0139426 | A1 | 6/2010 | Mori et al. | |
| 2017/0211671 | A1* | 7/2017 | Nakayama | C23C 16/27 |
| 2018/0355959 | A1* | 12/2018 | Homma | F16C 35/00 |

FOREIGN PATENT DOCUMENTS

| | | | | |
|---|---|---|---|---|
| CN | 203730557 U | | 7/2014 | |
| JP | 11-30234 A | | 2/1999 | |
| JP | 11159529 A | * | 6/1999 | ........... F16C 29/005 |
| JP | 2002-266856 A | | 9/2002 | |
| JP | 2003-247543 A | | 9/2003 | |
| JP | 2008-144939 A | | 6/2008 | |
| JP | 2010-138981 A | | 6/2010 | |
| JP | 2017-072197 A | | 4/2017 | |
| KR | 10-1999-0037095 A | | 5/1999 | |
| KR | 10-1999-0076187 A | | 10/1999 | |
| WO | 2005/038276 A1 | | 4/2005 | |

OTHER PUBLICATIONS

Office Action dated Oct. 15, 2020, issued in counterpart KR Application No. 10-2020-7019732, with English translation (12 pages).

International Search Report dated Apr. 23, 2019, issued in counterpart International Application No. PCT/JP2019/001930, w/English translation (2 pages).

* cited by examiner

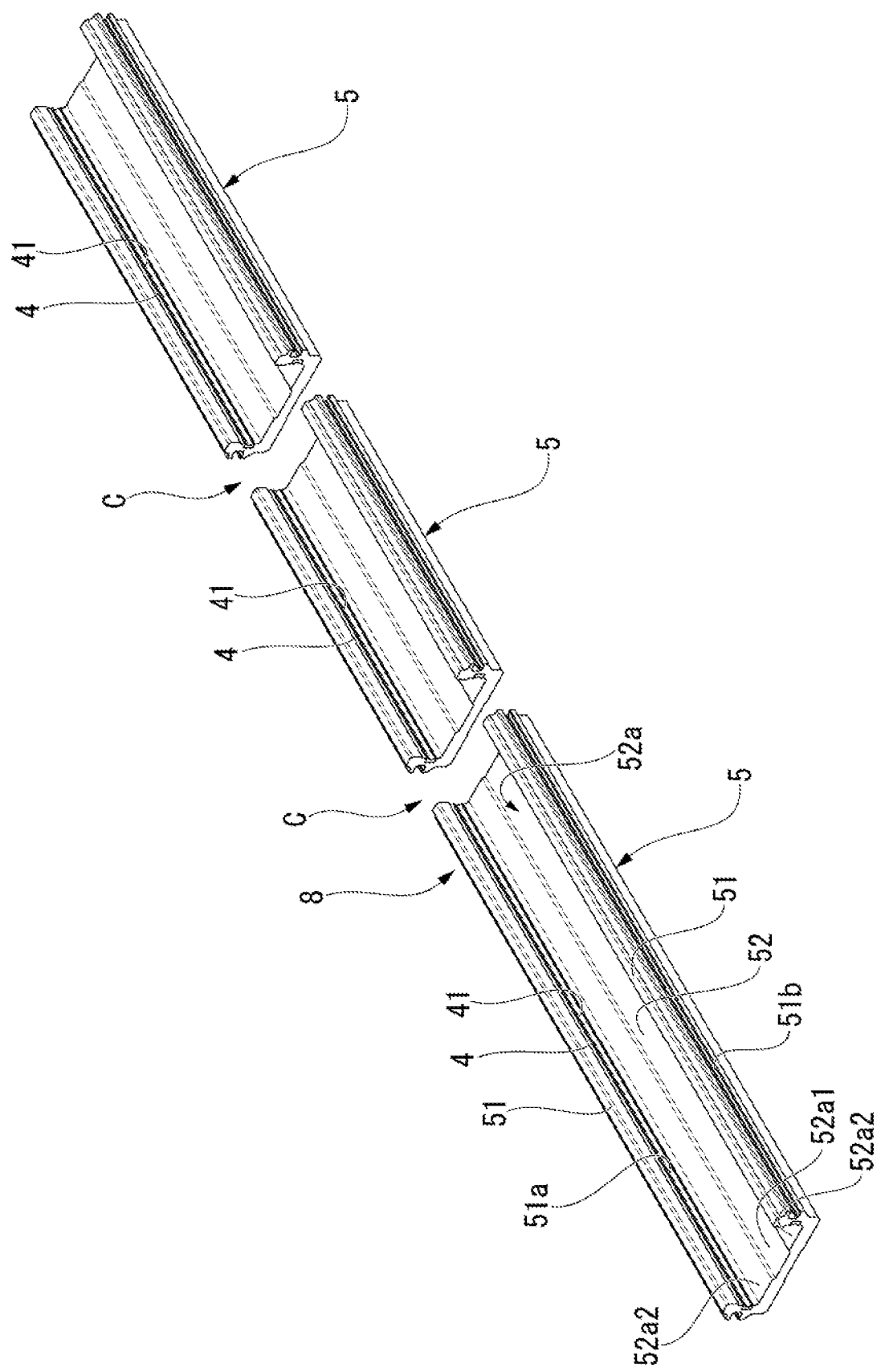

LINEAR MOTION GUIDE DEVICE AND METHOD FOR MANUFACTURING LINEAR MOTION GUIDE DEVICE

TECHNICAL FIELD

The present invention relates to a linear motion guide device and a method for manufacturing a linear motion guide device.

Priority is claimed on Japanese Patent Application No. 2018-022043, filed in Japan on Feb. 9, 2018, the content of which is incorporated herein by reference.

BACKGROUND ART

Patent Literature 1 described below discloses a table device as one of linear motion guide devices. The table device includes at least one linear motion device having a guide shaft extending in an axial direction and a movable body provided to be relatively movable along the guide shaft, a base member to which the guide shaft of the linear motion device is fixed, and a table member to which the movable body of the linear motion device is fixed. At least the guide shaft and the movable body are respectively fixed to the base member and the table member by a screw coupling. A groove part having a substantially T-shaped cross section is formed in at least one member of the base member and the table member in the axial direction of the guide shaft, and a coupling member for screw coupling is inserted into the groove part.

CITATION LIST

Patent Literature

[Patent Literature 1]
Japanese Unexamined Patent Application, First Publication No. 2008-144939

SUMMARY OF INVENTION

Technical Problem

The above-described base member of the conventional technology is formed in a substantially flat plate shape, and a guide rail is attached to an upper surface thereof using a bolt member. Incidentally, when a length in an axial direction of the linear motion guide device is changed due to a design change or the like, it is necessary to prepare a base member and a guide rail according to the length and combine them. If such a change is frequently made, since time and effort are required for design work of changing lengths of the base member and the guide rail, there are problems in that manufacturing costs increase and productivity decreases.

The present invention provides a linear motion guide device and a method for manufacturing a linear motion guide device in which manufacturing costs can be reduced and productivity of the device can be improved by significantly reducing time and effort required for design work when a length in an axial direction of the linear motion guide device is changed.

Solution to Problem

According to a first aspect of the present invention, a linear motion guide device includes a screw shaft, a moving body provided to be relatively movable along the screw shaft, a track body which guides the moving body in a longitudinal direction of the screw shaft, a base member including a pair of side wall parts to which the track body is attached and a bottom wall part connecting the pair of side wall parts, and extending in the longitudinal direction, and a bearing support part attached to the bottom wall part of the base member in a vertical direction and supporting the screw shaft via a bearing. The track body is attached to the pair of side wall parts over an entire length in the longitudinal direction of the base member. The bearing support part has a facing region facing the track body in a range of the entire length in the longitudinal direction of the base member and is attached to the bottom wall part so that movement of the moving body is restricted in the facing region.

According to a second aspect of the present invention, a method for manufacturing a linear motion guide device is a method for manufacturing a linear motion guide device including a screw shaft, a moving body provided to be relatively movable along the screw shaft, a track body which guides the moving body in a longitudinal direction of the screw shaft, a base member including a pair of side wall parts to which the track body is attached and a bottom wall part connecting the pair of side wall parts, and extending in the longitudinal direction, and a bearing support part attached to the bottom wall part of the base member in a vertical direction and supporting the screw shaft via a bearing. This manufacturing method includes a step of forming a long member including the pair of side wall parts and the bottom wall part, a step of attaching the track body to the pair of side wall parts of the long member, and a step of cutting away the base member to which the track body is attached by cutting the long member together with the track body into a desired length.

Advantageous Effects of Invention

According to the linear motion guide device and the method for manufacturing the linear motion guide device described above, manufacturing costs can be reduced and productivity of the device can be improved by significantly reducing time and effort required for design work when a length in an axial direction of the linear motion guide device is changed.

BRIEF DESCRIPTION OF DRAWINGS

FIG. 11 is an explanatory view illustrating a state in which the base member is cut away from the long member to which the track body is attached in step S3 shown in FIG. 8.

DESCRIPTION OF EMBODIMENTS

Hereinafter, a linear motion guide device and a method for manufacturing the linear motion guide device according to an embodiment of the present invention will be described with reference to the drawings.

First Embodiment

Figure 1:
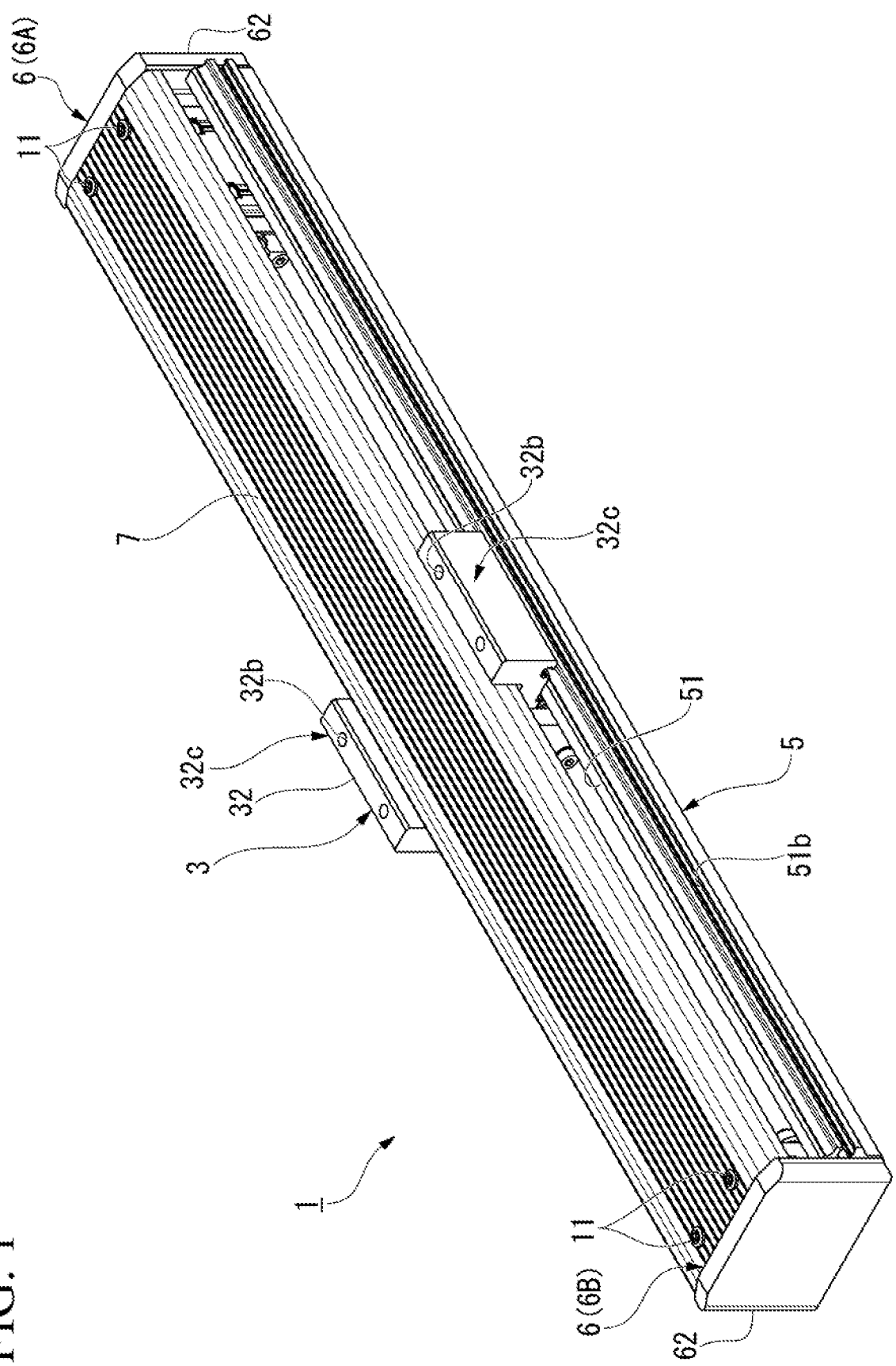
FIG. 1 is a perspective view of a linear motion guide device according to a first embodiment of the present invention.
Figure 2:
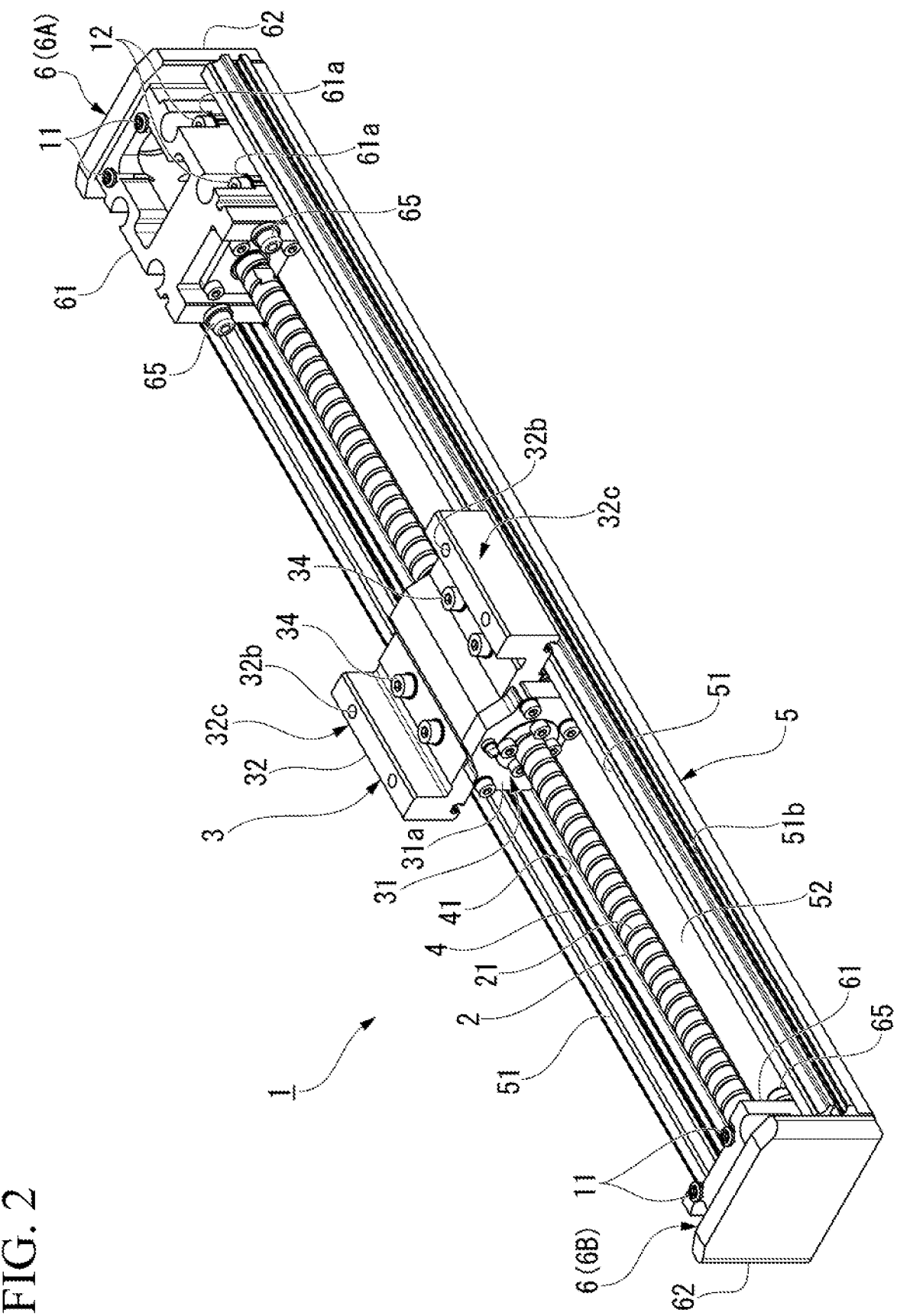
FIG. 2 is a perspective view illustrating a state in which a cover is removed from the linear motion guide device illustrated in FIG. 1.
Figure 3:
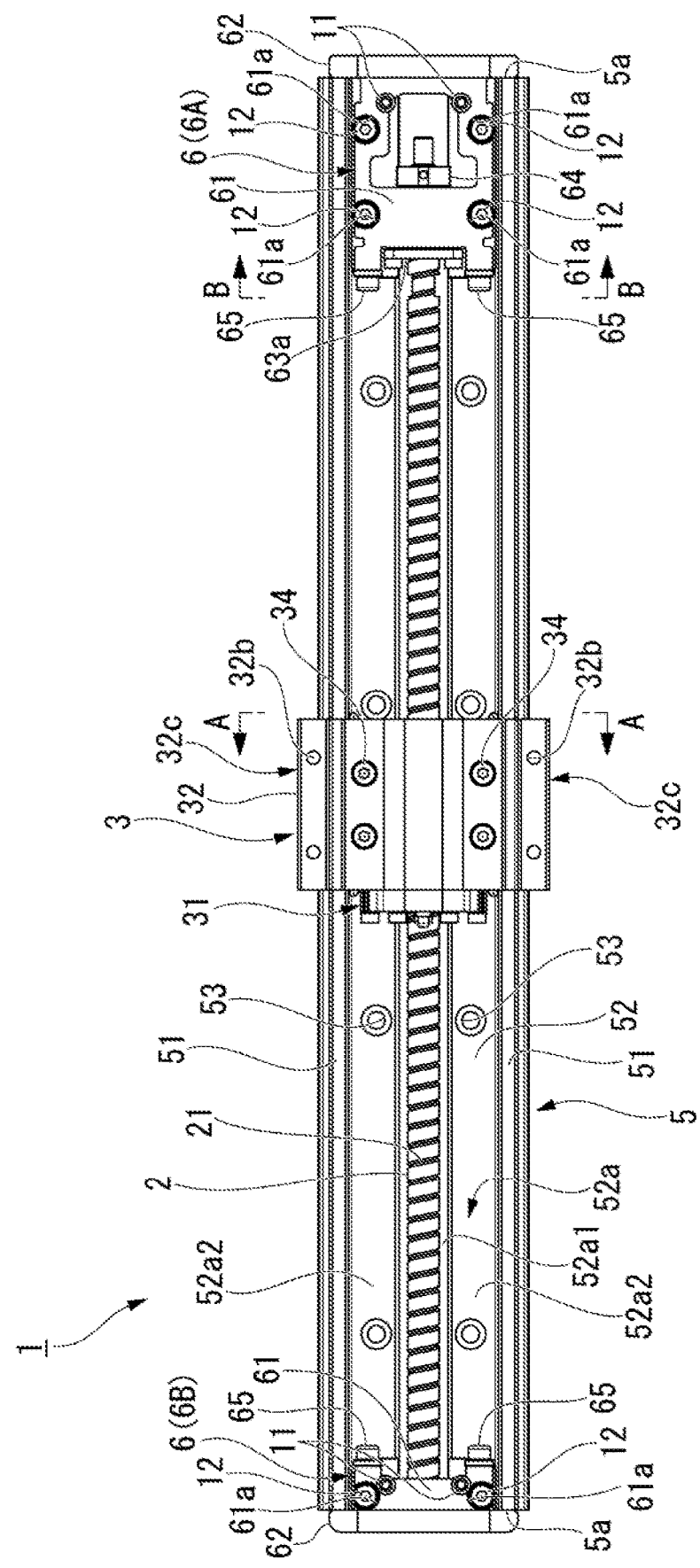
FIG. 3 is a plan view of the linear motion guide device illustrated in FIG. 2.
Figure 4:
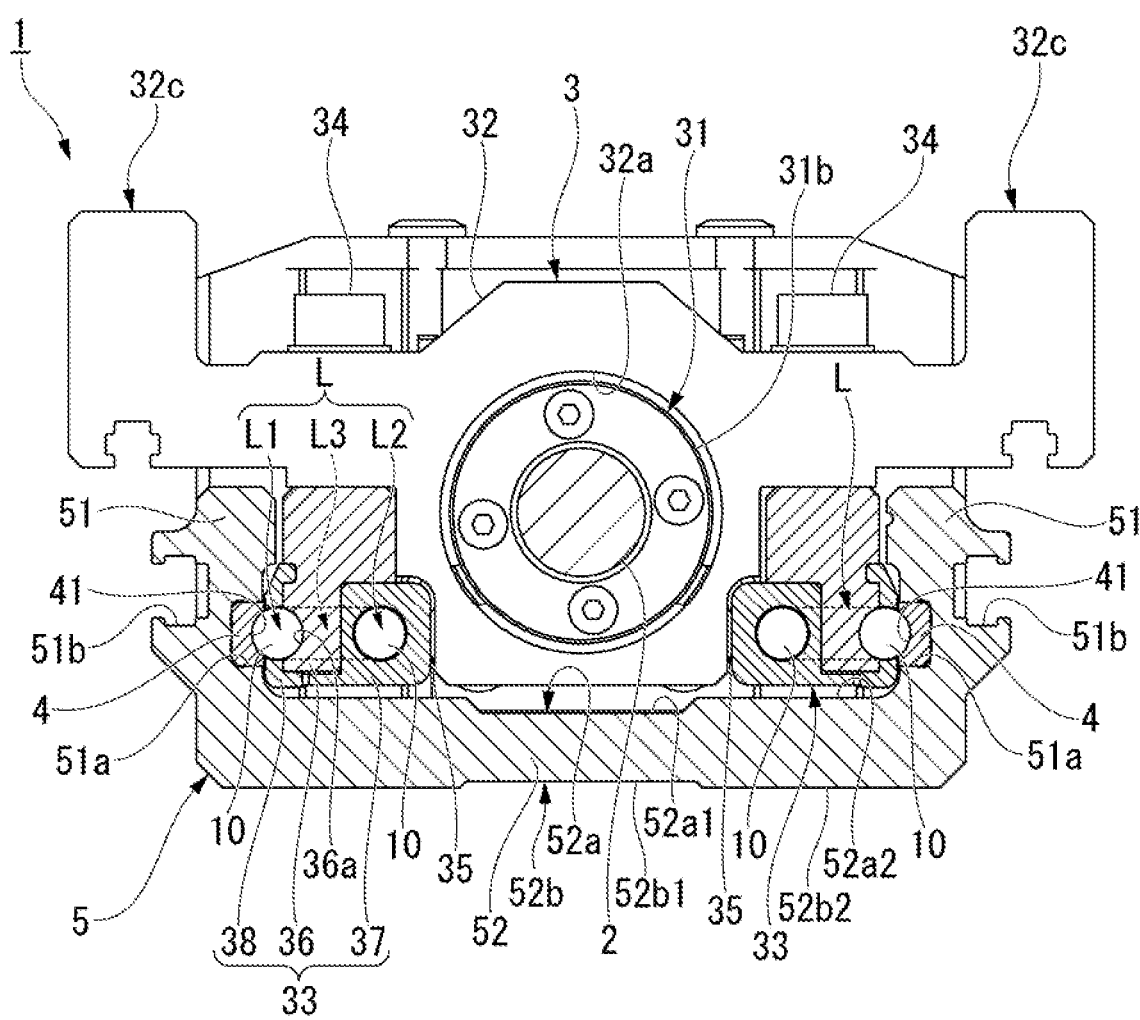
FIG. 4 is a view along line A-A illustrated in FIG. 3.
Figure 5:
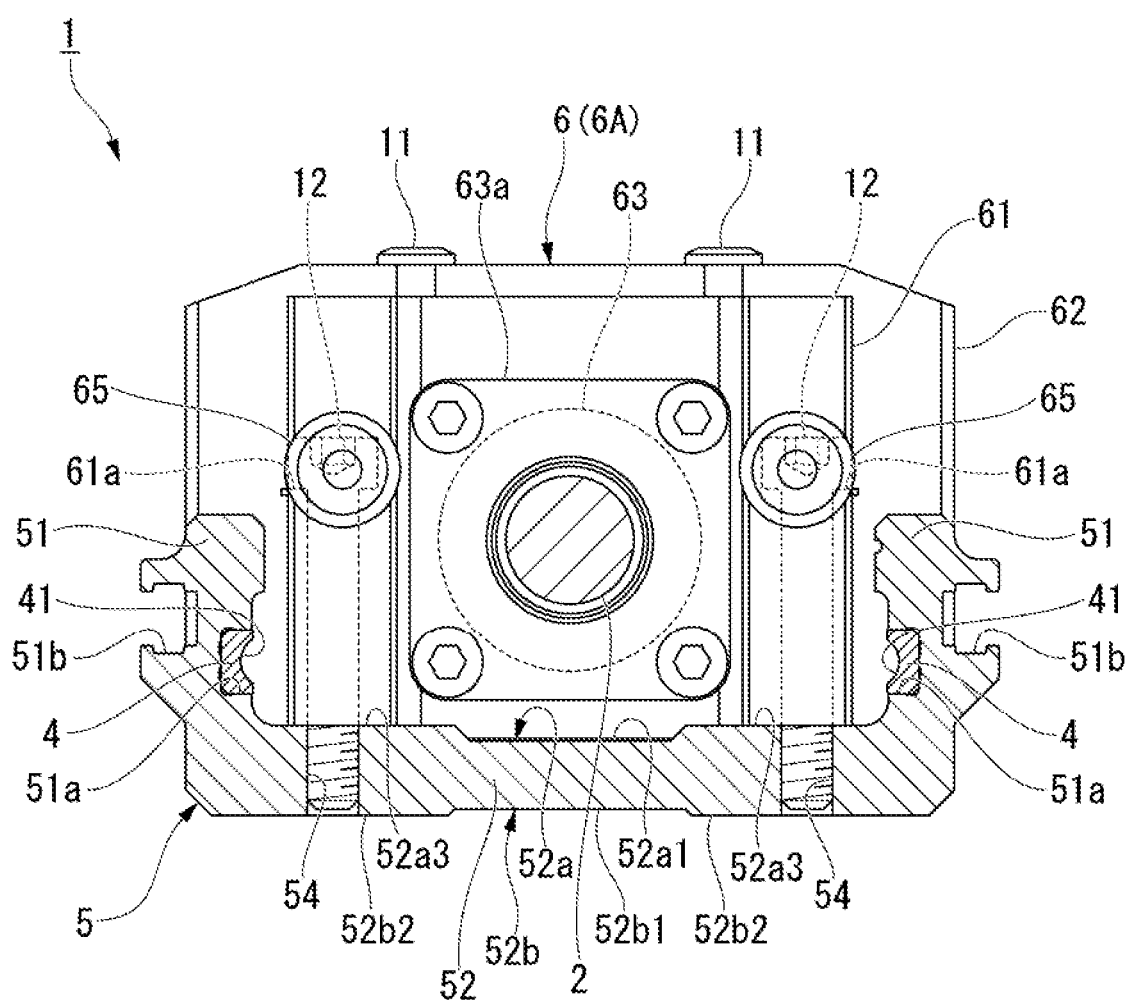
FIG. 5 is a view along line B-B illustrated in FIG. 3.

FIG. 1 is a perspective view of a linear motion guide device 1 according to a first embodiment of the present invention. FIG. 2 is a perspective view illustrating a state in which a cover 7 is removed from the linear motion guide device 1 illustrated in FIG. 1. FIG. 3 is a plan view of the linear motion guide device 1 illustrated in FIG. 2. FIG. 4 is a view along line A-A illustrated in FIG. 3. FIG. 5 is a view along line B-B illustrated in FIG. 3.

As illustrated in FIGS. 1 and 2, the linear motion guide device 1 includes a screw shaft 2, a moving body 3, a track body 4, a base member 5, a bearing support part 6, and the cover 7.

As illustrated in FIG. 2, the screw shift 2 has a spiral rolling element rolling groove 21 formed on an outer circumferential surface thereof. The moving body 3 is provided to be relatively movable along the screw shaft 2 in a longitudinal direction (axial direction) thereof. The moving body 3 includes a nut 31 and a slider 32. The nut 31 includes a flange 31a fixed to the slider 32, and a nut main body 31b (see FIG. 4) supported by the flange 31a and having a spiral rolling element load rolling groove (not illustrated) formed on an inner circumferential surface thereof.

The nut main body 31b includes a rolling element circulation component (not illustrated) such as a return pipe and endlessly circulates rolling elements (balls or the like) (not illustrated) interposed between the rolling element rolling groove 21 and the rolling element load rolling groove. As illustrated in FIG. 4, a through hole 32a accommodating the nut main body 31b is formed in the slider 32. Also, as illustrated in FIG. 1, a mounting hole 32b for mounting an object to be guided is formed in an upper portion of the slider 32. The mounting hole 32b is formed on an upper surface of a pair of extended parts 32c extending to the outside from a gap between the base member 5 and the cover 7.

As illustrated in FIG. 4, a guide member 33 is attached to a lower portion of the slider 32. A pair of guide members 33 are attached to both sides of the slider 32 in a width direction (direction perpendicular to the longitudinal direction of the screw shaft 2) using bolts 34. An elastic body 35 such as a hollowed rubber tube is disposed between the slider 32 and the guide member 33, and the guide member 33 is biased toward the track body 4.

The track body 4 is a rail body that guides the moving body 3 in the longitudinal direction of the screw shaft 2. The track body 4 is formed of a hard metal such as a steel. A rolling element rolling groove 41 is formed in the track body 4 in the longitudinal direction of the screw shaft 2. The guide member 33 includes a first member 36 in which a rolling element load rolling groove 36a facing the rolling element rolling groove 41 of the track body 4 is formed, a second member 37 in which an unloaded rolling element rolling path L2 is formed, and a frame-shaped cover member 38 which prevents a rolling element 10 from falling from the rolling element load rolling groove 36a.

The rolling element load rolling groove 36a faces the rolling element rolling groove 41 of the track body 4 and forms a loaded rolling element rolling path L1 which allows the rolling element 10 to roll in state in which a load is applied. An inner diameter of the unloaded rolling element rolling path L2 is larger than an outer diameter of the rolling element 10 so that a load is not applied to the rolling element 10. The guide member 33 includes a rolling element direction changing path L3 connecting both ends of the loaded rolling element rolling path L1 and the unloaded rolling element rolling path L2 and forms an endless circulation path L of the rolling element 10.

The base member 5 includes a pair of side wall parts 51 to which the track body 4 is attached and a bottom wall part 52 connecting the pair of side wall parts 51. The base member 5 is formed of a member lighter than the track body 4 (steel) such as, for example, an aluminum alloy. The pair of side wall parts 51 face each other in a width direction perpendicular to the longitudinal direction of the screw shaft 2. An attachment groove 51a of the track body 4 is formed on inner wall surfaces of the pair of side wall parts 51 facing each other. Further, a groove part 51b having a substantially T-shaped cross section (so-called T slot) is formed on outer wall surfaces of the pair of side wall parts 51.

The pair of side wall parts 51 are provided upright in a vertical direction from both end edges in the width direction of the bottom wall part 52. Therefore, the base member 5 is formed to have a substantially U-shaped cross section. The base member 5 extends in the longitudinal direction along the screw shaft 2. That is, the pair of side wall parts 51 and the bottom wall part 52 extend in the longitudinal direction along the screw shaft 2. In the following description, of the bottom wall part 52, a surface on which the pair of side wall parts 51 are provided upright is referred to as an upper surface 52a, and a surface on a side opposite to the upper surface 52a is referred to as a bottom surface 52b. As illustrated in FIG. 5, the bearing support part 6 is attached to the upper surface 52a of the bottom wall part 52.

The bearing support part 6 includes a main body part 61 that is vertically attached to the upper surface 52a of the bottom wall part 52 via a plurality of bolt members 12, and a cover part 62 formed integrally with the main body part 61 and extending outward from an end surface 5a in the longitudinal direction of the base member 5 as illustrated in FIG. 3. A counterbore part 61a accommodating a head part of the bolt member 12 is formed in the main body part 61. Further, the cover 7 illustrated in FIG. 1 is attached to the main body part 61 via a bolt member 11.

As illustrated in FIG. 3, the bearing support part 6 (a first bearing support part 6A) attached to one end portion in the longitudinal direction of the base member 5 supports one end portion of the screw shaft 2. Also, the bearing support part 6 (a second bearing support part 6B) attached to the other end portion in the longitudinal direction of the base member 5 supports the other end portion of the screw shaft 2. A coupling 64 for connecting to an output shaft of an electric motor (not illustrated) is provided at one end portion of the screw shaft 2. Therefore, a length of the first bearing support part 6A in the longitudinal direction of the main body part 61 is longer than a length of the second bearing support part 6B in the longitudinal direction of the main body part 61.

A stopper 65 capable of being in contact with the moving body 3 is attached to the main body part 61. As illustrated in FIG. 5, the main body part 61 accommodates a bearing 63 inside a bearing cover 63a and supports the screw shaft 2 via the bearing 63. A screw hole 54 is formed in the bottom wall part 52 of the base member 5. The main body part 61 is attached to the upper surface 52a of the bottom wall part 52 using the bolt member 12 screwed into the screw hole 54.

Figure 6:
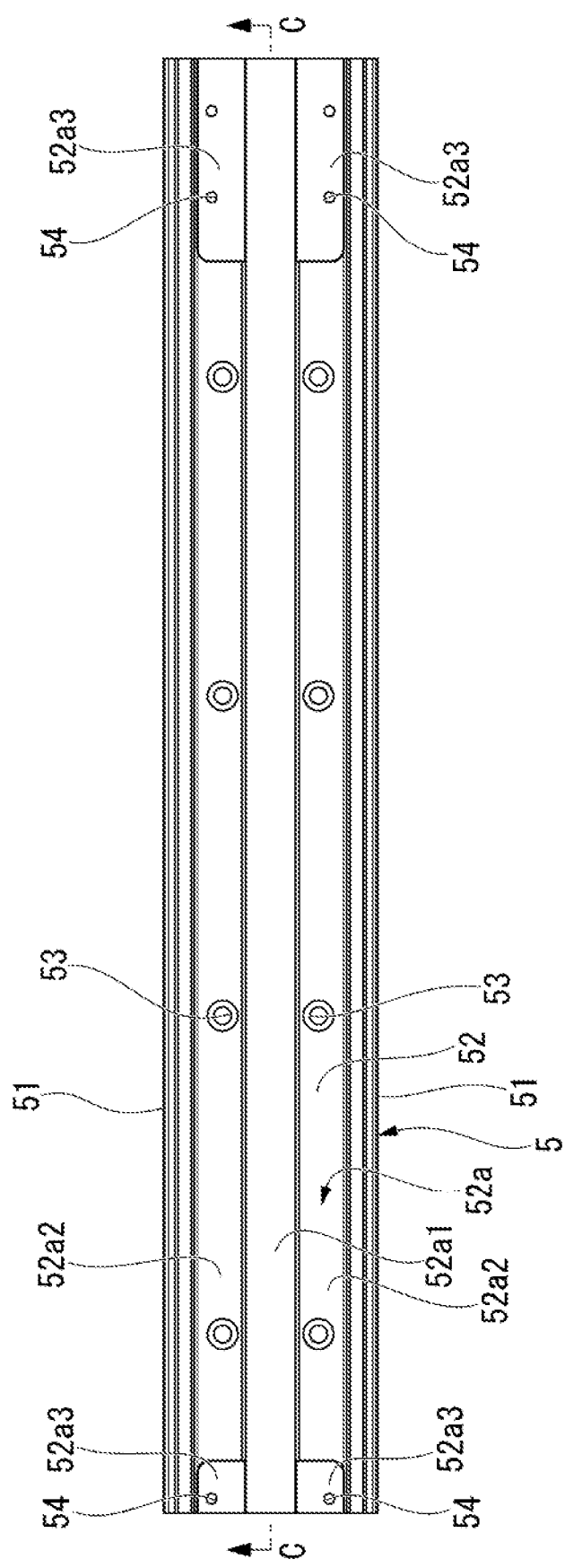
FIG. 6 is a plan view of a base member according to the first embodiment of the present invention.
Figure 7:
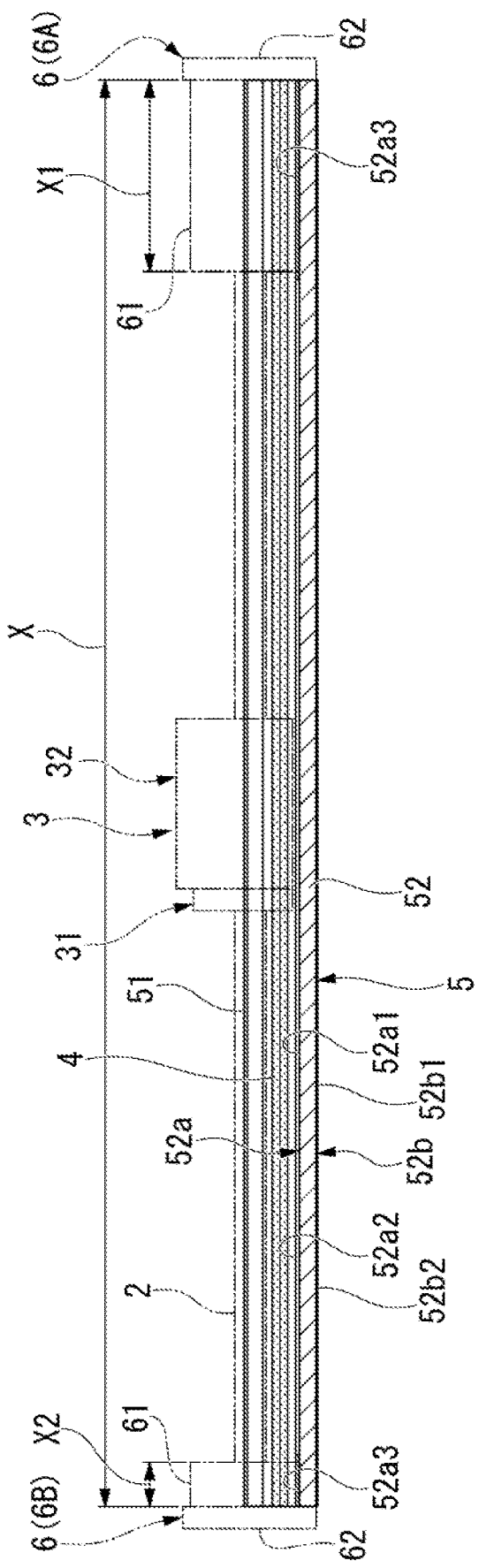
FIG. 7 is a view along line C-C illustrated in FIG. 6.

FIG. 6 is a plan view of the base member 5 according to the first embodiment of the present invention. FIG. 7 is a view along line C-C illustrated in FIG. 6.

As illustrated in FIG. 6, a bottomed recess 52a1 is formed at a center portion in the width direction of the upper surface 52a of the bottom wall part 52. The recess 52a1 extends over the entire length of the bottom wall part 52 in the longitudinal direction. There are steps on both sides of the recess 52a1 in the width direction, and first planar parts 52a2 are formed by the steps. Each of the first planar parts 52a2 is formed at a position higher than that of a bottom surface of the recess 52a1. An attachment hole 53 for attaching the base member 5 to an attachment target object (not illustrated) is formed in the first planar part 52a2.

Second planar parts 52a3 serving as attachment surfaces of the bearing support part 6 are formed at both end portions in the longitudinal direction of the first planar part 52a2. The second planar parts 52a3 are each formed at a position lower than that of the first planar part 52a2. The screw hole 54 is formed in the second planar part 52a3. As for a height relationship, the first planar part 52a2 is the highest, the second planar part 52a3 is the next highest, and the lowest is the bottom surface of the recess 52a1.

Further, as illustrated in FIG. 5, the bottom surface 52b of the bottom wall part 52 also includes a topped recess 52b1 formed at a center portion thereof in the width direction. The recess 52b1 extends over the entire length of the bottom wall part 52 in the longitudinal direction. There are steps on both sides of the recess 52b1 in the width direction, and planar parts 52b2 are formed by the steps. Each of the planar parts 52b2 is formed at a position lower than that of a top surface of the recess 52b1. That is, the planar part 52b2 protrudes downward from the top surface of the recess 52b1.

The main body part 61 of the bearing support part 6 faces the track body 4 in the width direction in a state of being attached to the bottom wall part 52 via the bolt member 12. Although there is a gap between the main body part 61 and the track body 4, it can be said that the main body part 61 blocks a part of the track body 4 so that a part of a stroke of the track body 4 does not function, that is movement of the moving body 3 is restricted in a part of a stroke of the track body 4.

As illustrated in FIG. 7, the track body 4 is attached to the pair of side wall parts 51 over the entire length of the base member 5 in the longitudinal direction. That is, lengths of the track body 4 and the base member 5 (the side wall parts 51) in the longitudinal direction are the same as each other. The bearing support part 6 has facing regions X1 and X2 in which the main body part 61 faces the track body 4 in a range X over the entire length of the base member 5 in the longitudinal direction. In the facing, regions X1 and X2, movement of the moving body 3 is restricted. That is, a movement range of the moving body 3 is shorter than the stroke of the track body 4 and specifically is X−(X1+X2).

Next, a method for manufacturing the linear motion guide device 1 having the above described configuration (hereinafter referred to as the present method in some cases) will be described.

Figure 8:
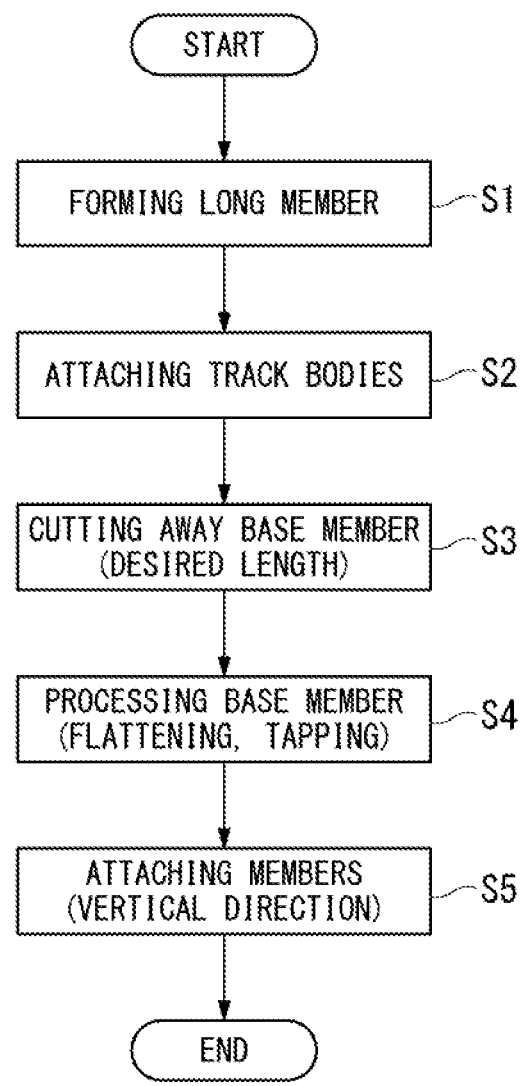
FIG. 8 is a flowchart showing a method for manufacturing the linear motion guide device according to the first embodiment of the present invention.

FIG. 8 is a flowchart showing a method for manufacturing the linear motion guide device 1 according to the first embodiment of the present invention.

The linear motion guide device 1 is manufactured schematically according to the flow shown in FIG. 8 through a step of forming a long member 8 (step S1), a step of attaching the track body 4 (step S2), a step of cutting away the base member 5 (step S3), a step of processing the base member 5 (step S4), and a step of attaching components (step S5).

Figure 9:
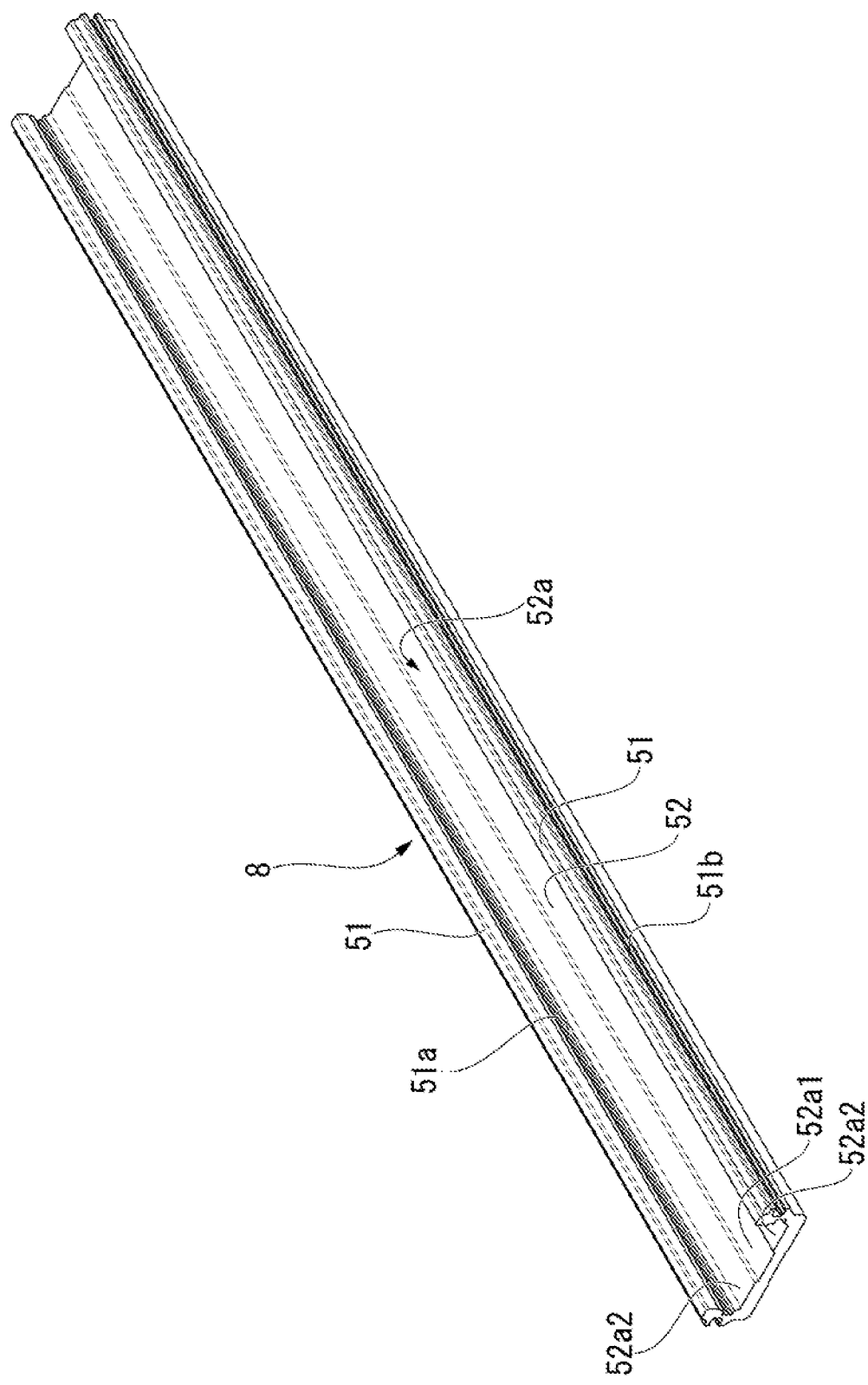
FIG. 9 is a perspective view of a long member formed in step S1 shown in FIG. 8.

FIG. 9 is a perspective view of the long member 8 formed in step S1 shown in FIG. 8.

In the present method, the long member 8 illustrated in FIG. 9 is formed in step S1. The long member 8 is a member in which the base member 5 is elongated in the longitudinal direction and includes the pair of side wall parts 51 and the bottom wall part 52. Such a long member 8 can be suitably formed by extrusion molding of, for example, an aluminum material. On the bottom wall part 52 of the long member 8, the recess 52a1 and the first planar parts 52a2 are formed, but the second planar parts 52a3 are not formed. Further, the track body 4 is not yet attached to the long member 8.

Figure 10A:
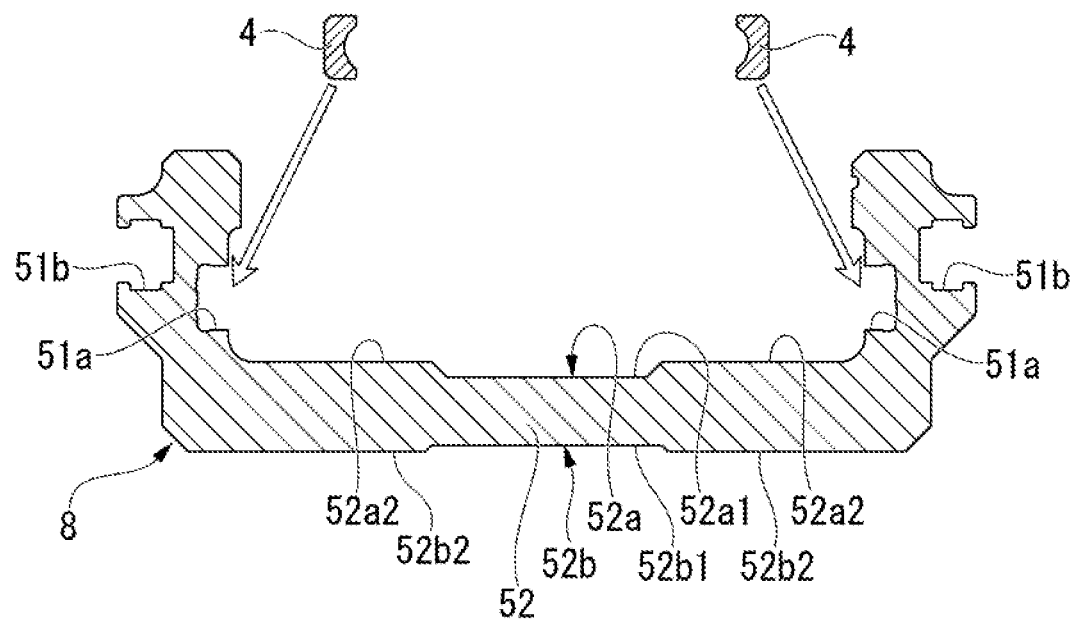
FIG. 10A is an explanatory view illustrating a state in which a track body is attached to the long member in step S2 shown in FIG. 8.
Figure 10B:
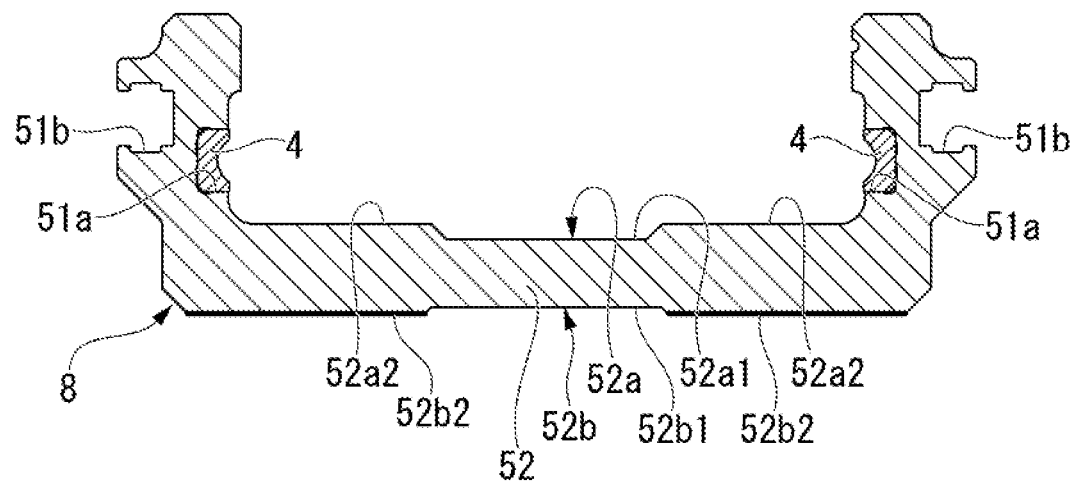
FIG. 10B is an explanatory view illustrating a state in which a track body is attached to the long member in step S2 shown in FIG. 8.

FIGS. 10A and 10B are explanatory views illustrating a state in which the track body 4 is attached to the long member 8 in step S2 shown in FIG. 8.

In the present method, in step S2 described below, the track body 4 is attached to the pair of side wall parts 51 of the long member 8. The track body 4 has been subjected to a heat treatment such as quenching in advance and has substantially the same length as the long member 8. As illustrated in FIG. 10A, the track body 4 is attached to the attachment grooves 51a formed in the pair of side wall parts 51 of the base member 5 with an adhesive or the like.

When the adhesive is solidified, next, in the present method, the bottom surface 52b (the planar part 52b2) of the bottom wall part 52 of the base member 5 is flattened as illustrated in FIG. 10B. Thereby, the planar part 52b2 serves as a reference surface that provides an attachment accuracy for the track body 4 and other components.

Next, in the present method, the long member 8 is fixed to a groove grinder (not illustrated), and groove grinding processing of the track body 4 is performed with the planar part 52b2 as a reference. When the groove grinding processing of the track body 4 is performed using the groove grinder with the planar part 52b2 as a reference, the rolling element rolling groove 41 is formed.

FIG. 11 is an explanatory view illustrating a state in which the base member 5 is cut away from the long member 8 to which the track body 4 is attached in step S3 shown in FIG. 8.

In the present method, in step S3 described below, the long member 8 is cut into a desired length together with the track body 4, and the base member 5 to which the track body 4 is attached is cut away. Reference sign C denoted in FIG. 11 indicates a cut portion of the long member 8. For cutting the long member 8 to which the track body 4 is attached, for example, a grindstone cutting machine or the like can be suitably used. The base member 5 cut away in this way has the same length as the track body 4, and end surfaces of the base member 5 and the track body 4 are aligned.

In the present method, in step S4 described below, as illustrated in FIG. 6, flattening for forming the second planar part 52a3 on the bottom wall part 52 of the cut base member 5 is performed, and tapping for forming the screw hole 54 in the second planar part 52a3 is performed. The second planar parts 52a3 formed at both end portions in the longitudinal direction of the first planar part 52a2 can be processed at the same time with the planar part 52b2 on the bottom surface 52b side as a reference, thereby achieving a planar accuracy. After the second planar part 52a3 is formed, the screw hole 54 is formed and the attachment hole 53 is formed in the first planar part 52a2.

Figure 12:
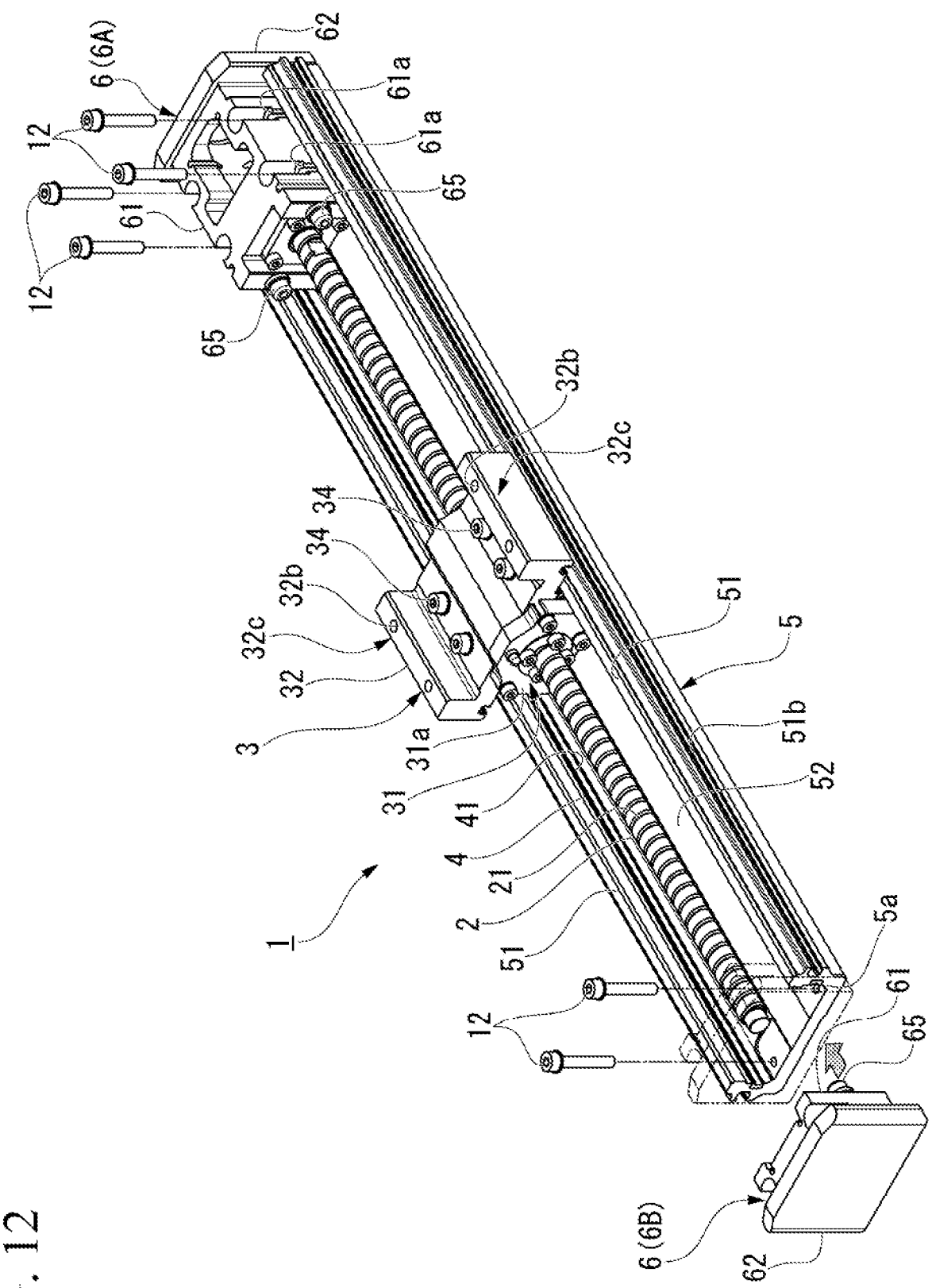
FIG. 12 is an explanatory view illustrating a state in which components are attached to the base member in step S5 shown in FIG. 8.

FIG. 12 is an explanatory view illustrating a state in which components are attached to the base member 5 in step S5 shown in FIG. 8.

In the present method, in step S5 described below, the bearing support part 6 is attached to the bottom wall part 52 (the second planar part 52a3) of the base member 5 in the vertical direction. Specifically, first, the slider 32 is assembled to the base member 5 to which the track body 4 is attached in the longitudinal direction. Next, the main body part. 61 of the first bearing support part 6A is vertically attached to the bottom wall part 52 at one end portion in the longitudinal direction of the base member 5. Attachment of the first bearing support part 6A is performed by vertically screwing the bolt member 12 into the screw hole 54 formed in the second planar part 52a3.

Next, one end of the screw shaft 2 is made to be supported by the first bearing support part 6A through the through hole 32a of the slider 32, and the nut 31 assembled to the screw shaft 2 is fixed to the slider 32. Next, the second bearing support part 6B is assembled to the other end portion of the screw shaft 2 in the longitudinal direction, and the main body part 61 of the second bearing support part 6B is vertically attached to the bottom wall part 52 at the other end portion in the longitudinal direction of the base member 5. Attachment of the second bearing support part 6B is performed by vertically screwing the bolt member 12 into the screw hole 54 formed in the second planar part 52a3.

Finally, as illustrated in FIG. 1, the cover 7 is attached via the bolt member 11, and thereby the linear motion guide device 1 described above can be manufactured.

As described above, according to the present method described above, even when a length in the axial direction of the linear motion guide device 1 is changed, since the long member 8 can be cut into a desired length together with the track body 4 and the base member 5 to which the track body 4 is attached can be cut away, time and effort are not required for design work of changing lengths of the track body 4 and the base member 5. Thereby, manufacturing costs can be reduced, and productivity of the linear motion guide device 1 can be improved. Also, even when design change is frequently made, since it is sufficient if one long member 8 to which the track body 4 is attached is prepared as a component, a length in the axial direction of the linear motion guide device 1 can be easily changed, for example, without having kept large numbers of track bodies 4 and base members 5 of different types having different lengths in stock beforehand.

In the linear motion guide device 1 manufactured by the present method, as illustrated in FIG. 7, the track body 4 is attached to the pair of side wall parts 51 over the entire length of the base member 5 in the longitudinal direction, and the bearing support part 6 has the facing regions X1 and X2 facing the track body 4 in a range X of the entire length of the base member 5 in the longitudinal direction and is attached to the bottom wall part 52 so that movement of the moving body 3 is restricted in the facing regions X1 and X2. In this way, the bearing support part 6 is intentionally attached to the bottom wall part 52 so that movement of the moving body 3 is restricted in a part of the stroke of the track body 4, and thereby reduction in manufacturing costs and improvement in productivity of the linear motion guide device 1 described above can be achieved.

Also, the present method includes a step (step S5) of attaching the bearing support part 6 to the bottom wall part 52 of the base member 5 in a vertical direction after the base member 5 is cut away. According to the present method, as illustrated in FIG. 12, since attachment of the bearing support part 6 to the base member 5 via the bolt member 12 is completed in only one direction in the vertical direction with respect to the bottom wall part 52, attachment work of the bearing support part 6 with respect to the base member 5 is facilitated. Also, as for attachment accuracy, since it is sufficient if accuracy in one direction perpendicular to the bottom wall part 52 is secured, for example, end surface grinding processing or the like for securing accuracy of the end surface 5a in the longitudinal direction of the base member 5 can be curtailed.

Also, in the present method, after the base member 5 is cut away in step S3 and before the bearing support part 6 is attached in step S5, as illustrated in FIG. 6, the attachment region of the bearing support part 6 in the bottom wall part 52 is flattened to form the second planar part 52a3. According to the present method, even when flatness in the attachment region of the bearing support part 6 of the bottom wall part 52 is not secured, for example, only by extrusion molding, the bearing support part 6 can be attached to the bottom wall part 52 with high accuracy by forming the second planar part 52a3. Also, since an attachment height of the bearing support part 6 is uniquely determined by the second planar part 52a3, a step of adjusting the attachment height of the bearing support part 6 can be curtailed. Also, the attachment hole 53, the screw hole 54, and the like are formed at the same time when the second planar part 52a3 is flattened, thereby the number of work man-hours as a whole can be reduced.

Second Embodiment

Next, a second embodiment of the present invention will be described. In the following description, configurations the same as or equivalent to those of the above-described embodiment are denoted by the same reference signs, and description thereof will be simplified or omitted.

Figure 13:
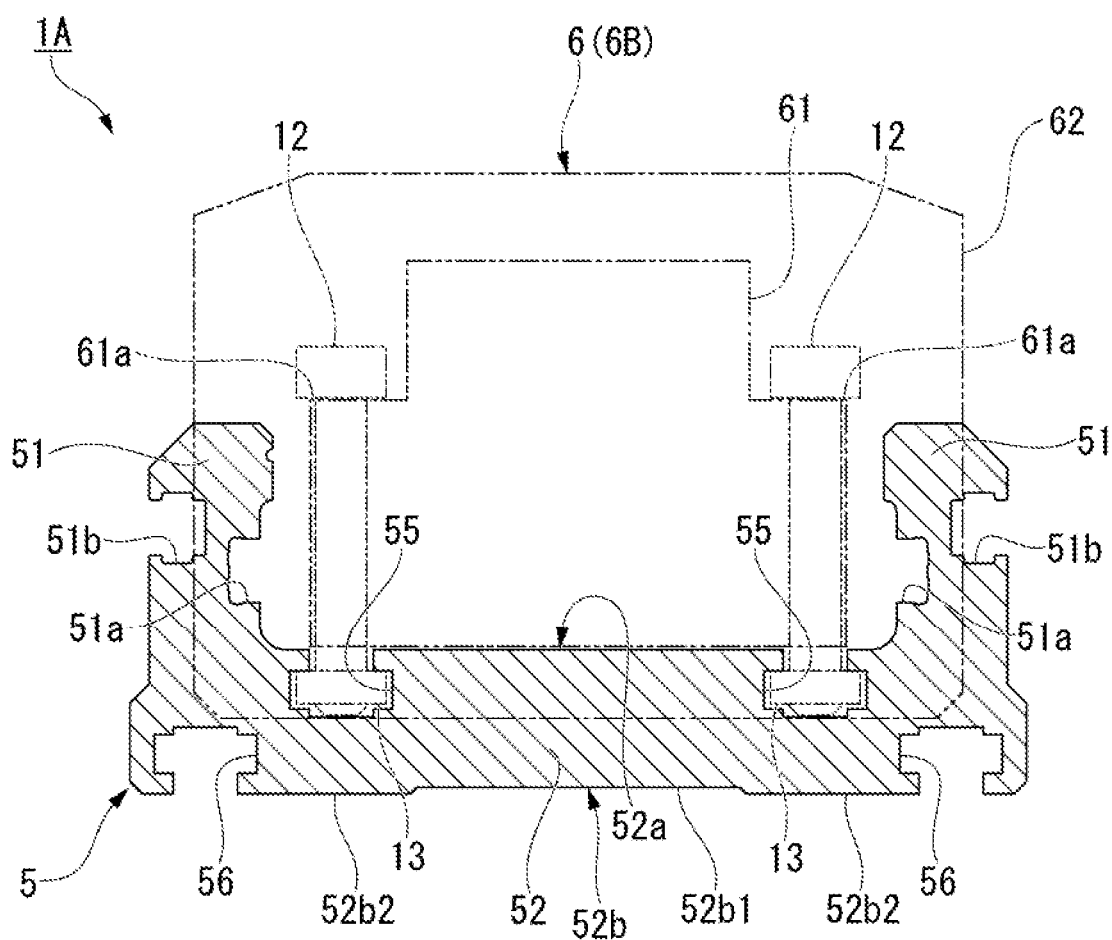
FIG. 13 is a cross-sectional view of a base member according to a second embodiment of the present invention.
Figure 14:
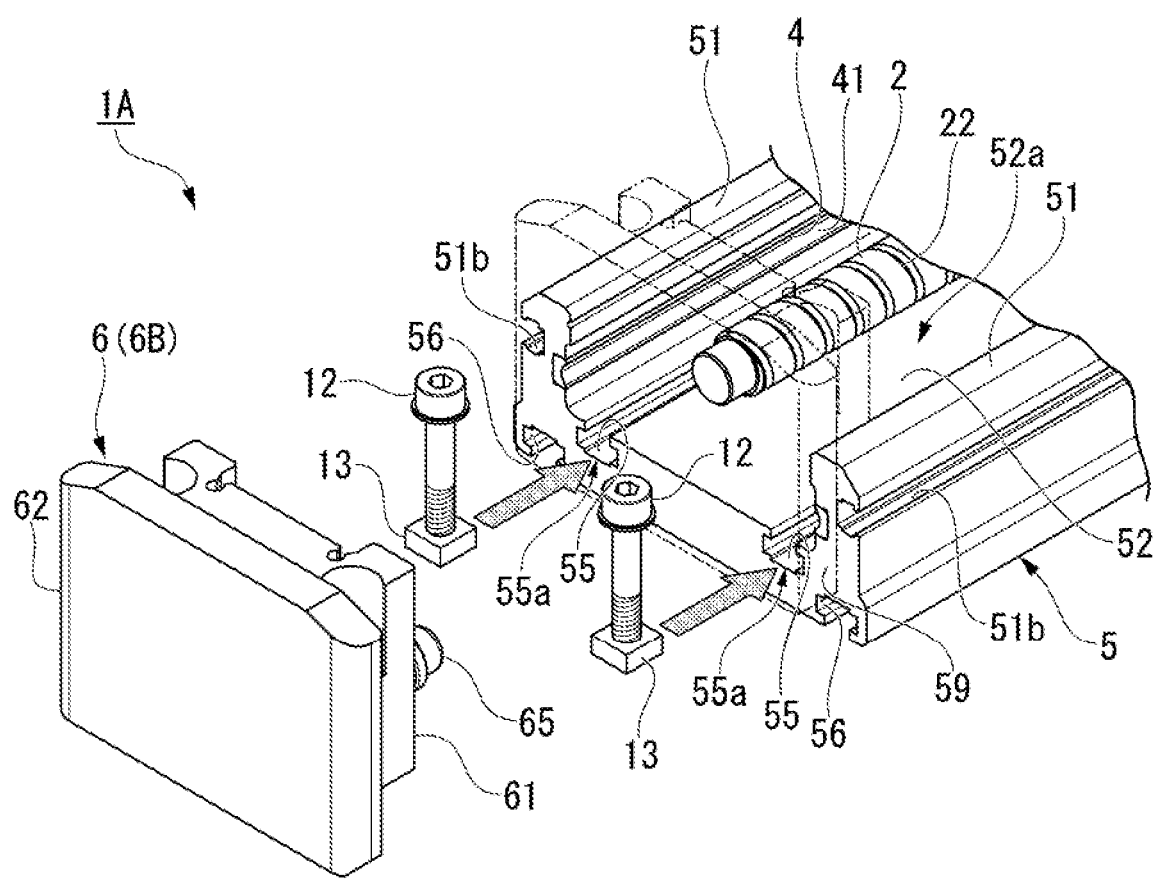
FIG. 14 is an explanatory view illustrating a state in which a bearing support part is attached to the base member according to the second embodiment of the present invention.

FIG. 13 is a cross-sectional view of a base member 5 according to the second embodiment of the present invention. FIG. 14 is an explanatory view illustrating a state in which a bearing support part 6 is attached to the base member 5 according to the second embodiment of the present invention.

As illustrated in FIG. 13, a linear motion guide device 1A according to the second embodiment is different from the above-described embodiment in that it includes the base member 5 in which a groove part 55 having a substantially T-shaped cross section is formed in a bottom wall part 52 in a longitudinal direction.

The groove part 55 is formed on an upper surface 52a of the bottom wall part 52. The groove part 55 extends over the entire length of the bottom wall part 52 in the longitudinal direction. The groove part 55 is formed at a position corresponding to the screw hole 54 of the above-described embodiment in place of it, and a nut member 13 into which a bolt member 12 is screwed can be inserted thereto. Also, in the second embodiment, in place of the attachment hole 53 of the above-described embodiment, a groove part 56 having a substantially T-shaped cross section is formed also on a bottom surface 52*b* of the bottom wall part 52.

According to the second embodiment having the above-described configuration, as illustrated in FIG. 14, when the bolt member 12 is screwed into the nut member 13 in the groove part 55 after the nut member 13 is inserted into the groove part 55 and the bearing support part 6 (a second bearing support part B) is assembled to an end surface 5*a* of the base member 5 (the other end portion of a screw shaft 2) in the longitudinal direction, a main body part 61 of the bearing support part 6 can be attached to the bottom wall part 52 in a vertical direction.

According to such a configuration, since the bearing support part 6 can be vertically attached to a desired position in the longitudinal direction of the base member 5 using the groove part 55, tapping of the screw hole 54 in step S4 shown in FIG. 8 can be curtailed. Also, if accuracy of extrusion molding of the base member 5 can be secured in step S1 shown in FIG. 8, the flattening in step S4 can also be curtailed. Therefore, according to the second embodiment, step S4 illustrated in FIG. 8 can also be curtailed.

Also, as illustrated in FIG. 14, the bearing support part 6 includes a cover part 62 extending outward from the end surface 5*a* in the longitudinal direction of the base member 5 and covering an opening end 55*a* of the groove part 55 formed in the end surface 5*a*. As illustrated in FIG. 13, an outer shape of the cover part 62 is slightly larger than an outer shape of the main body part 61, and the groove part 55 is formed (disposed) inside the outer shape. According to this configuration, since the nut member 13 can be prevented from falling off the opening end 55*a* of the groove part 55, attachment work of the bearing support part 6 with respect to the base member 5 is facilitated.

The preferred embodiments of the present invention have been described above with reference to the drawings, but the present invention is not limited to the above-described embodiments. Shapes, combinations, or the like of the respective constituent members illustrated in the above-described embodiments are merely examples, and various changes can be made on the basis of design requirements or the like without departing from the scope of the present invention.

For example, the rolling, element is not limited to a ball. The rolling element may be, for example, a cylindrical roller, a barrel shape, a skew shape, or the like.

INDUSTRIAL APPLICABILITY

According to the linear motion guide device and the method for manufacturing the linear motion guide device described above, manufacturing costs can be reduced and productivity of the device can be improved by significantly reducing time and effort required for design work when a length in an axial direction of the linear motion guide device is changed.

REFERENCE SIGNS LIST 1, 1A Linear motion guide device
2 Screw shaft
3 Moving body
4 Track body
5 Base member
5*a* End surface
6 Bearing support part
8 Long member
12 Bolt member
13 Nut member
51 Side wall part
52 Bottom wall part
52*a*2 First planar part
52*a*3 Second planar part
55 Groove part
55*a* Opening end
62 Cover part
63 Bearing
C Cut portion
X1 Facing region
X2 Facing region

The invention claimed is:

1. A linear motion guide device comprising:
a screw shaft;
a moving body provided to be relatively movable along the screw shaft;
a track body which guides the moving body in a longitudinal direction of the screw shaft;
a base member including a pair of side wall parts to which the track body is attached and a bottom wall part connecting the pair of side wall parts, and extending in the longitudinal direction; and
a bearing support part attached to each end of the bottom wall part of the base member in a vertical direction and supporting each end of the screw shaft via a bearing, wherein
the track body is attached to the pair of side wall parts over an entire length in the longitudinal direction of the base member,
the bearing support part has a facing region facing the track body in a range of the entire length in the longitudinal direction of the base member and is attached to the bottom wall part so that movement of the moving body is restricted in the facing region,
wherein the bottom wall part includes:
a first planar part; and
a second planar part which is formed at a position lower than that of the first planar part and to which the bearing support part is attached.

2. The linear motion guide device according to claim 1, wherein a groove part having a substantially T-shaped cross section is formed in the bottom wall part in the longitudinal direction,
the linear motion guide device further comprising:
a nut member inserted into the groove part; and
a bolt member screwed into the nut member and attaching the bearing support part to the bottom wall part in the vertical direction.

3. The linear motion guide device according to claim 2, wherein the bearing support part includes a cover part extending outward from an end surface in the longitudinal direction of the base member and covering an opening end of the groove part formed in the end surface.

4. A method for manufacturing a linear motion guide device that includes:
a screw shaft;
a moving body provided to be relatively movable along the screw shaft;
a track body which guides the moving body in a longitudinal direction of the screw shaft;
a base member including a pair of side wall parts to which the track body is attached and a bottom wall part connecting the pair of side wall parts, and extending in the longitudinal direction; and a bearing support part attached to each end of the bottom wall part of the base member in a vertical direction and supporting each end of the screw shaft via a bearing, the method for manufacturing the linear motion guide device comprising the steps of:

forming a long member including the pair of side wall parts and the bottom wall part;

attaching the track body to the pair of side wall parts of the long member;

cutting away the base member to which the track body is attached by cutting the long member together with the track body into a desired length;

flattening an attachment region for the bearing support part in the bottom wall part at opposite ends of the bottom wall part after the cutting; and attaching the bearing support part to the attachment region in the bottom wall part at axial ends of the base member in the longitudinal direction to provide non-movable terminal ends for movement of the moving body along the screw shaft.

5. The method for manufacturing a linear motion guide device according to claim 4, wherein the attaching of the bearing support part to the attachment region in bottom wall part of the base member is in a vertical direction.

* * * * *